United States Patent [19]

Tomes

[11] 4,349,809
[45] Sep. 14, 1982

[54] OFFROAD VEHICLE INCLINOMETER AND ALARM

[76] Inventor: Marcus B. Tomes, 625 - 2nd Ave., Chula Vista, Calif. 92010

[21] Appl. No.: 248,854

[22] Filed: Mar. 30, 1981

[51] Int. Cl.³ .............................................. B60Q 5/00
[52] U.S. Cl. .................................. 340/52 H; 340/65; 340/689; 200/61.45 R
[58] Field of Search ................... 340/52 H, 53, 61, 65, 340/689; 200/61.45 R, 61.47, 61.52

[56] References Cited

U.S. PATENT DOCUMENTS 3,204,233 8/1965 Olliff ................................... 340/689

Primary Examiner—Alvin H. Waring
Attorney, Agent, or Firm—Brown & Martin

[57] ABSTRACT

An apparatus for detecting the angle of inclination of a vehicle and for providing an alarm signal when the inclination of the vehicle exceeds a predetermined maximum safe level. An elongate, pliant tubular member made of an electrically conductive material has its intermediate segment mounted by an insulative clamp to a vertical panel which may be situated on the vehicle's dashboard. The end segments of the tubular member are upwardly inclined, and the degree of inclination is shown by angular indicia on adjacent portions of the vertical panel. A plurality of spherical contact elements made of an electrically conductive material are positioned within the tubular member. A pair of contact points made of an electrically conductive material are inserted into the opposite ends of the tubular member. When the angle of inclination of the vehicle exceeds the safe level, the contact elements will strike one of the contact points. This causes an electric current from the vehicle's battery to energize an indicator such as a buzzer which provides a warning signal.

7 Claims, 5 Drawing Figures

OFFROAD VEHICLE INCLINOMETER AND ALARM

BACKGROUND OF THE INVENTION

The present invention relates vehicle accessory equipment, and more particularly, to an apparatus for detecting the angle of inclination of a vehicle and for providing an alarm signal when the inclination of the vehicle exceeds a predetermined safety limit.

In recent years, the driving of automotive type vehicles over rough terrain has increased substantially, both as a form of recreation and in connection with work in remote areas. In the offroad vehicle sport, trucks, JEEP brand vehicles, and other powered automotive type vehicles are frequently driven over steeply inclined terrain. As a safety precaution, most of these offroad vehicles are equipped with roll bars and seat belts to protect the passengers if the vehicle should roll. In addition, a number of inclinometers have been available for use in offroad vehicles to provide the driver with an indication of the degree to which his or her vehicle is inclined so that the driver will not exceed the safe limit of inclination of the vehicle.

A first one of the aforementioned available inclinometers comprises a glass tube with a ball bearing and colored water therein. The glass tube has indicia in the form of degree markings. A second one of these inclinometers is sometimes referred to as a tilt and grade indicator. Two tiny facsimiles of an offroad vehicle are secured to the lower ends of corresponding pendulums which rotate around horizontal axes. The tiny vehicle facsimiles rotate adjacent protractor-like panels to provide an indication of the degree of inclination. In a third type of inclinometer which has been available for use in offroad vehicles, a ball with degree markings thereon is buoyantly supported in a fluid and is enclosed within a transparent container. As the vehicle tips, the angle of inclination can be read off of the floating ball.

The aforementioned inclinometers are typically mounted on the dashboard of an offroad vehicle. Their use requires that the driver repeatedly observe them to obtain a reading of the angle of inclination of the vehicle. This can be dangerous since driving over rough terrain requires the full attention of the driver. The driver should always watch where he or she is going and should not look away at some device mounted on the dashboard. Furthermore, the aforementioned inclinometers are not very accurate. Typically, an offroad vehicle experiences substantial bumping and jerking motion. This can cause inclinometers of the aforementioned type to give false readings. Finally, the aforementioned inclinometers require that the driver be constantly aware of the safe degree of inclination of his or her vehicle so that the reading given by the inclinometer can be compared thereto.

SUMMARY OF THE INVENTION

Accordingly, it is an object of the present invention to provide an inclinometer and alarm apparatus for a vehicle that will signal the operator of the vehicle when the inclination of the vehicle exceeds a predetermined safe limit.

Another object of the present invention is to provide an inclinometer and alarm apparatus for a vehicle that can be adjusted to accommodate driver preference, or to accommodate changes in the center of gravity of the vehicle due to modifications of the vehicle structure or load.

It is still another object of the present invention to provide an inclinometer and alarm apparatus for a vehicle which has a reasonable reaction time so that the alarm signal will not be activated as a result of sudden side-to-side jolts of the vehicle when it is being operated in rough terrain.

The present invention provides an apparatus for detecting the angle of inclination of a vehicle and for providing an alarm signal when the inclination of the vehicle exceeds a predetermined maximum safe level. An elongate, pliant tubular member made of an electrically conductive material has its intermediate segment mounted by an insulative clamp to a vertical panel which may be situated on the vehicle's dashboard. The end segments of the tubular member are upwardly inclined, and the degree of inclination is shown by angular indicia on adjacent portions of the verticle panel. A plurality of spherical contact elements made of an electrically conductive material are positioned within the tubular member. A pair of contact points made of an electrically conductive material are inserted into the opposite ends of the tubular member. When the angle of inclination of the vehicle exceeds the safe level, the contact elements will strike one of the contact points. This causes an electric current from the vehicle's battery to energize an indicator such as a buzzer which provides a warning signal.

The end segments of the tubular member can be bent upwardly or downwardly to adjust the angle of inclination necessary to yield the alarm signal. This will permit the apparatus to be utilized with vehicles having different centers of gravity. The utilization of multiple spherical contact elements within the tubular member, along with the quantity of lubricant, slows the reaction time of the apparatus. This will prevent sudden jolts of the vehicle during travel over rough terrain from causing false alarms.

DESCRIPTION OF THE PREFERRED EMBODIMENT

Figure 1:
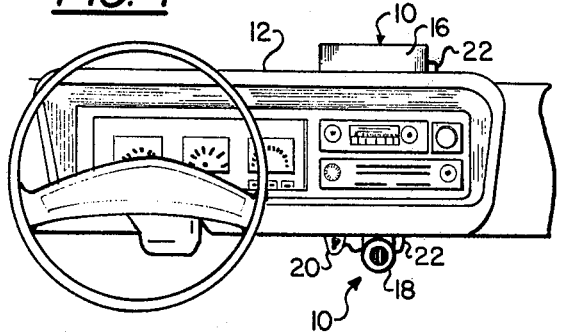
FIG. 1 is an elevation view of a portion of the dashboard of a vehicle illustrating the installation of a preferred embodiment of my invention.
Figure 4:
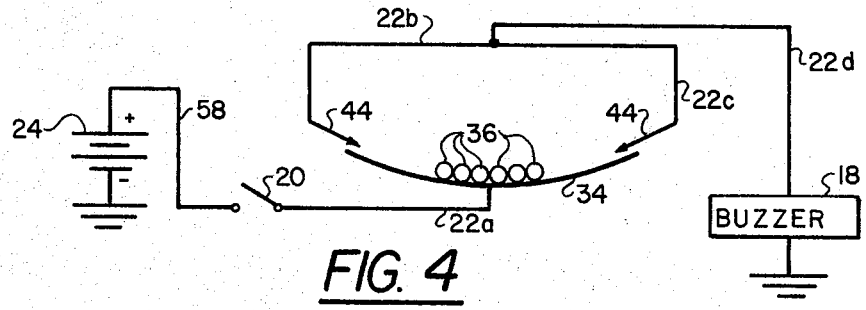
FIG. 4 is a schematic diagram of the preferred embodiment of my apparatus.
Figure 5:
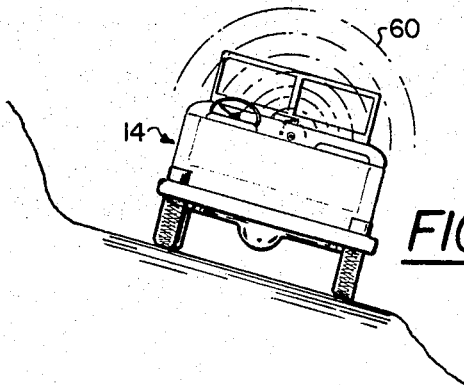
FIG. 5 illustrates an offroad vehicle inclined on terrain past the safe limit predetermined by the driver, depicting the energization of the audio alarm.

Referring to FIG. 1, a preferred embodiment 10 of the present invention is shown mounted on the dashboard 12 of a vehicle 14 (FIG. 5). The components of my apparatus which are visible in FIG. 1 include a dust cover 16 which contains components hereafter described, an electrical buzzer 18, a toggle switch 20 and wires 22 which connect the components of the apparatus to each other and to a source of electric current such as the battery 24 (FIG. 4) of the vehicle.

Figure 2:
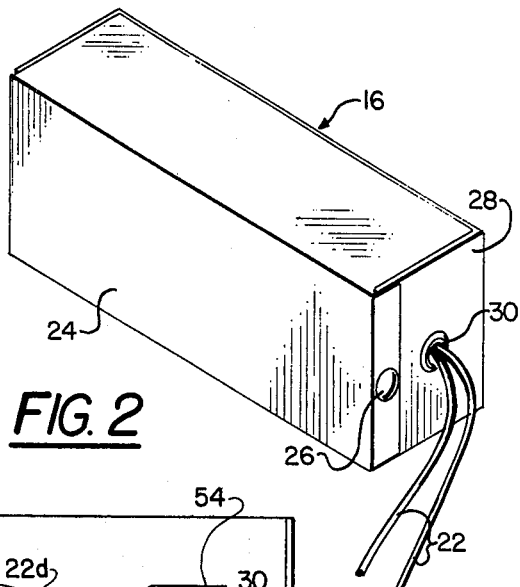
FIG. 2 is an enlarged perspective view of the dust cover which encloses a substantial portion of the operative components of the preferred embodiment.

As shown in FIG. 2, the dust cover 16 comprises a rectangular box having a removable cover plate 24 detachably secured by screws 26 to a base portion 28. Preferably, the cover plate 24 and the base portion 28 are made of anodized aluminum. A pair of the wires 22 extend through a hole in one end of the base portion 28. The wires are protected from the sharp edges of the hole by a grommet 30 seated in the hole.

Figure 3:
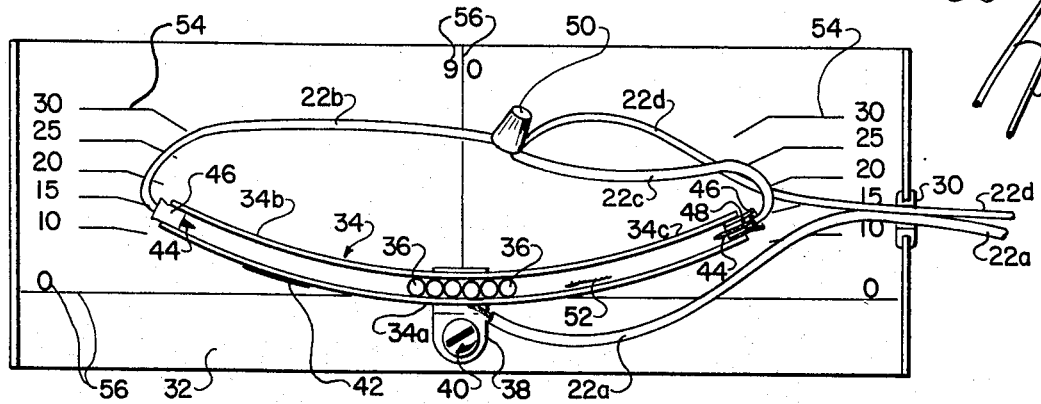
FIG. 3 is an enlarged elevation view of the components inside the cover of FIG. 2.

Referring to FIG. 3, the base portion 28 of the dust cover 16 includes a vertically extending rear panel 32. An elongate tubular member 34 is secured to the vertical panel 32. The tubular member is made of an electrically conductive material and has an intermediate segment 34a and a pair of upwardly inclined end segments 34b and 34c. The tubular member is plaint so that the end segments 34b and 34c can be manually bent upwardly or downwardly to adjust the safe inclination limit of the device. In the preferred embodiment, the tubular member 34 is made of a length of copper tubing having a one-quarter inch outside diameter. The end segments of the length of copper tubing are gradually curved upwardly from the intermediate segment so that a plurality of spherical contact elements 36 can move longitudinally inside the tubing between the end thereof as the tubing is rotated about an axis perpendicular to the vertical panel 32.

The tubular member 34 (FIG. 3) is mounted to the rear panel 32 by a clamp 38 which is detachably secured to the center of the panel adjacent its lower periphery by a screw 40. Preferably, the clamp comprises a strap made of an electrically insulating material such as plastic which surrounds the intermediate segment of the tubular member. The tubular member is thus held in spaced relationship from the vertical panel 32. The wires 22 are coated with insulation material. One of these wires 22a has the insulation removed from its terminal end, and it is held in contact with the electrically conductive tubular member by the clamp 38. Except for the portion of the tubular member which is concealed by the clamp 38, the remainder of the outer surface of the tubular member has a coating of electrically insulating material shown at 42 in FIG. 3.

A pair of contact points 44 (FIG. 3) are inserted in opposite ends of the tubular member 34. These contact points are held rigidly in position and are electrically insulated from the tubular member by cylindrical plastic insulators 46 which surround the contact points. The outside diameter of the inner portions of the insulators 46 is slightly less than the inside diameter of the tubing so that the insulators can be inserted into the tubing. The outer ends of the insulators are flared outwardly so that the insulators can be snuggly fit into the ends of the tube and will thereafter remain in position.

Preferably, the contact points 44 (FIG. 3) are inexpensively manufactured by stripping the insulation away from the ends of a pair 22b and 22c of the wires. The exposed multiple copper strands of the wires are then rolled and are laced with solder. A tube crimp 48 is then installed on each wire around the terminal portion of the insulation. The insulators 46 are then slid over the tube crimps. The tips of the soldered wires are cut to form points. The entire assemblies are inserted into the ends of the tubular member. The other ends of the wires 22b and 22c are stripped and are electrically connected to the stripped ends of another wire 22b by a junction connector 50. The wires 22a and 22d extend through the hole in one end of the base portion 28 of the cover through the grommet 30.

The contact elements 36 (FIG. 3) are preferably spherical in shape and are made of an electrically conductive material. In the preferred embodiment, the contact elements 36 comprise six copper BB's. They roll back and forth inside the copper tubing as the tubing and the panel 32 are rotated or tilted about an axis extending substantially perpendicular to the plane of the panel. In addition, preferably a quantity of a lubricant is placed within the interior of the tubular member 34 along with the contact elements 36. This lubricant is designated generally by the reference numeral 52. Preferably, the lubricant is lightweight oil. The purpose of having multiple spherical contact elements 36 and lubrication is to slow the reaction time of the device. This reduces the likelihood that jerking or jolting of the vehicle as it is driven over rough terrain will activate the buzzer 18 when in fact the vehicle has not exceeded its safe limit of inclination established in advance by the driver. The lubricant also serves to keep the contact points, the ball bearings, and the interior surface of the copper tubing 34 clean. In addition, the lubricant serves to keep a negative valence to protect against oxidation of the aforementioned components.

Additional lubrication can be added to the interior of the tubular member 34 by placing a few drops on the wires 22b and 22c at the place where they enter the rearward ends of the insulators 46 (FIG. 3). The lubricant will slowly pass through the insulators to the interior of the tubing. Lubricant should be added when the reaction time of the device becomes too fast to give an accurate indication that the vehicle has exceeded a predetermined safe limit of inclination.

The panel 32 (FIG. 3) of the cover which is behind the tubular member 34 is provided with indicia on either side thereof for providing an indication of the degree of inclination of the end segments 34b and 34c of the tubular member with respect to the intermediate segment 34a thereof. The panel 32 is further provided with indicia 56 in the form of horizontal and vertical lines from which the degree indication indicia 54 are referenced. It will be understood that the intermediate segment 34a of the tubular member is aligned with the intersection of the lines of the indicia 56.

The apparatus is installed on the dashboard 12 (FIG. 1) when the vehicle is on level ground. A plum bob suspended by a string is used to insure that the tubular member is properly oriented with respect to the vehicle. The vertical one of the lines of the indicia 56 (FIG. 3) is lined up with the string. The vertical one of the lines 56 is perpendicular to the horizontal one of the lines 56. The intermediate segment 34a of the tubular member overlies the horizontal one of the lines 56 in parallel relationship.

The user then conservatively estimates the safe maximum limit of lateral inclination that his or her vehicle can withstand without rolling. With the cover plate 24 removed, the user then bends the end segments 34b and 34c of the tubular member upwardly until their bottom walls are roughly aligned with lines of angular displacement determined by the indicia 54 which correspond to the maximum safe level of inclination just determined. Preferably, the ends of the tubular member are bent upwardly in a smooth curving fashion to facilitate travel of the spherical contact elements 36 from end to end of the tubular member. If the suspension of the vehicle is later modified, or if the passenger load varies considerably, the positions of the end segments 34b and 34c of the tubular member may be readjusted. When adjustment is complete, the cover plate 24 is replaced so that the operative components within the cover 16 are protected over long periods of use from dust and damage.

The operation of the apparatus can be readily understood by way of reference to the schematic diagram of FIG. 4. The wire 22a has one end connected to the conductive tubular member 34 and has its other end connected to one side of the toggle switch 20. The other side of the toggle switch is connected to any fused wire of the vehicle such as 58 which is connected to the positive terminal of the vehicle's battery 24.

In operation, when a person is driving the vehicle over rough terrain, the switch 20 (FIG. 4) is closed. This connects the walls of the tubular member 34 to the power source. When the vehicle exceeds a predetermined safe maximum limit of lateral inclination, the contact elements 36 will roll within the tubular member sufficiently to one side to cause one of the outwardmost contact elements to contact one of the contact points 44. That contact element establishes an electrical connection between the contact point and the tubular member. The lightweight oil is dissipated at the point where the contact element touches the contact point and the tubular member. Current can then flow through one of the wires 22b and 22c, through the wire 22d to one side of the electrical buzzer 18, the other side of which is connected to ground. The buzzer is immediately energized and provides an audio indication to the driver that the vehicle has exceeded the predetermined maximum safe level of inclination. The high intensity sound emitted by the buzzer 18 is represented by the sound waves 60 shown in FIG. 5. The driver is immediately made aware that driving is hazardous and that any steeper lateral inclination of the vehicle should be avoided. Preferably, the buzzer 18 puts out an audio signal of at least 100 decibels in strength so that it can be heard above a very loud stereo system in the vehicle. Thus, when the vehicle is equipped with the apparatus of the present invention, the driver is provided with a warning signal and need not repeatedly observe an instrument mounted on the dashboard. If desired, other forms of electrical indicator means could be used in place of or in addition to the buzzer 18. These might include, for example, bells, lights, horns, etc. When it is desired to deactivate the inclinometer and alarm apparatus, the driver can manually open the toggle switch 20.

Having described a preferred embodiment of my inclinometer and alarm apparatus, it should be apparent to those skilled in the art that my invention permits of modification in arrangement and detail. Therefore, the protection afforded my invention should be limited only in accordance with the scope of the following claims.

I claim:
1. An inclinometer and alarm apparatus for a vehicle comprising:
    an elongate, pliant tubular member made of an electrically conductive material and having an intermediate segment and a pair of upwardly inclined end segments;
    a vertical panel;
    means for mounting the intermediate segment of the tubular member to the panel with the end segments of the tubular member inclined upwardly;
    indicia on the panel for providing an indication of the degree of inclination of the end segments of the tubular member with respect to the intermediate segment of the tubular member;
    a pair of contact points made of an electrically conductive material inserted into the opposite ends of the tubular member;
    means for electrically insulating the contact points from the tubular member;
    a plurality of spherically shaped contact elements made of an electrically conductive material positioned within the tubular member and adapted to move longitudinally therein into contact with the contact points upon a predetermined degree of rotation of the vertical panel about an axis perpendicular to the panel;
    a quantity of a lubricant within the tubular member;
    electrical indicator means for providing a human perceivable warning signal upon energization; and
    electrical circuit means for connecting the tubular member, the contact points and the electrical indicator means to a source of electric current so that the electrical indicator means will be energized when the contact elements move into contact with the contact points;
    whereby when the vehicle exceeds a predetermined safe limit of inclination set by bending the end segments of the tubular member a predetermined amount upwardly with respect to the intermediate segment, the electrical indicator means will provide a warning signal, while jolting of the vehicle as it is driven over rough terrain will not cause a false alarm.

2. An apparatus according to claim 1 wherein the electrical indicator means comprises a buzzer adapted to emit an audio signal of at least one-hundred decibels in strength when energized.

3. An apparatus according to claim 1 wherein the electrical circuit means includes switch means for permitting disconnection of the tubular member from the source of electric current.

4. An apparatus according to claim 1 and further comprising cover means for enclosing the tubular member.

5. An apparatus according to claim 1 wherein the contact points comprise wire laced with solder.

6. An apparatus according to claim 1 and further comprising indicia on the panel for providing horizontal and vertical lines from which the degree indication indicia are referenced.

7. An apparatus according to claim 1 wherein the mounting means includes a detachable clamp made of an electrically insulative material.

* * * * *